US008331614B2

(12) United States Patent
Mannerheim et al.

(10) Patent No.: US 8,331,614 B2
(45) Date of Patent: Dec. 11, 2012

(54) METHOD AND APPARATUS FOR TRACKING LISTENER'S HEAD POSITION FOR VIRTUAL STEREO ACOUSTICS

(75) Inventors: Pal Mannerheim, Southampton (GB);
Phillip Arthur Nelson, Romsey (GB);
Youngtae Kim, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1165 days.

(21) Appl. No.: 11/646,472

(22) Filed: Dec. 28, 2006

(65) Prior Publication Data
US 2007/0230743 A1 Oct. 4, 2007

(30) Foreign Application Priority Data

Mar. 28, 2006 (KR) .................. 10-2006-0028027

(51) Int. Cl.
*G06K 9/80* (2006.01)
*H04R 5/02* (2006.01)
(52) U.S. Cl. .................. 382/103; 382/106; 382/154
(58) Field of Classification Search .................. 382/103, 382/154
See application file for complete search history.

(56) References Cited

U.S. PATENT DOCUMENTS

| 5,815,199 A * | 9/1998 | Palm et al. ............ 348/143 |
| 6,188,777 B1 * | 2/2001 | Darrell et al. ............ 382/103 |
| 6,263,113 B1 * | 7/2001 | Abdel-Mottaleb et al. ... 382/237 |
| 2005/0196015 A1 * | 9/2005 | Luo et al. ............ 382/103 |
| 2006/0187305 A1 * | 8/2006 | Trivedi et al. ............ 348/169 |
| 2006/0198554 A1 * | 9/2006 | Porter et al. ............ 382/159 |
| 2006/0239471 A1 * | 10/2006 | Mao et al. ............ 381/92 |
| 2007/0011196 A1 * | 1/2007 | Ball et al. ............ 707/104.1 |

FOREIGN PATENT DOCUMENTS

KR 10-0612031 8/2006

OTHER PUBLICATIONS

Korean Office Action for corresponding Korean Patent Application No. 10-2006-0043516 dated Sep. 19, 2007.

* cited by examiner

*Primary Examiner* — Claire X Wang
*Assistant Examiner* — Michael Vanchy, Jr.
(74) *Attorney, Agent, or Firm* — Staas & Halsey LLP (57) ABSTRACT

A method and apparatus for tracking a listener's head position for virtual stereo acoustics. The method of tracking the head position of a listener includes: obtaining face images of the listener using two image pickup units; tracking the skin color of an image, thereby obtaining the two-dimensional (2D) coordinate value of the listener's position; and obtaining the distance between the image pickup units and the listener using triangulation.

15 Claims, 6 Drawing Sheets

METHOD AND APPARATUS FOR TRACKING LISTENER'S HEAD POSITION FOR VIRTUAL STEREO ACOUSTICS

CROSS-REFERENCE TO RELATED APPLICATION

This application claims the benefit of Korean Patent Application No. 10-2006-0028027, filed on Mar. 28, 2006, in the Korean Intellectual Property Office, the disclosure of which is incorporated herein by reference.

BACKGROUND OF THE INVENTION

1. Field of the Invention

The present invention relates to image processing used in virtual stereo acoustics, and more particularly, to a method and apparatus for tracking the position of the head of a listener for virtual acoustics.

2. Description of Related Art

In virtual stereo acoustics, a listener can enjoy the best stereo sound effect when he/she is positioned in a so-called listening sweet spot, that is, an optimum listening area, predefined by a crosstalk cancellation processing. Outside of the listening sweet spot, the stereo sound effect is degraded. That is, the performance of a stereo sound system is sensitive to the relative positions of the listener and the listening sweet spot. Accordingly, it is desirable to maximize the size of (i.e. broaden) the listening sweet spot. However, maximizing the listening sweet spot by using known filtering technology is limited. As a result, other approaches are being explored. One such approach is resetting the location of the sweet spot based on a location of a listener. In order to perfectly reset the listening sweet spot with respect to the 3-dimensional (3D) movement of the listener, tracking of a 3D path of the listener's movement is essential. For this, conventional methods employ a magnetic, infrared or laser unit. However, these approaches result in increased user inconvenience.

Visual tracking is a major subject in the field of computer vision. Visual tracking is of such interest because it has become a factor lowering the cost of computing, video cameras and memories. In an image sequence taken around a video rate, a change between frames is not sudden, and this redundancy of information in relation to multiple images can be of great help in analyzing an input in order to track individual objects. An ideal algorithm for this application should be robust against background noise, capable of tracking the position of the head and efficient in calculation.

BRIEF SUMMARY

An aspect of the present invention provides a method and apparatus for tracking the position of the head of a listener for virtual acoustics, used to broaden the listening sweet spot of the listener in a stereo sound system using video cameras.

According to an aspect of the present invention, there is provided a method of tracking a position of a head of a listener, the method including: obtaining two images of the listener respectively using two image pickup units; tracking a skin color of one of the images, thereby obtaining a 2-dimensional (2D) coordinate value of the position; and obtaining a distance between the image pickup units and the listener using stereo area correlation.

The obtaining of the 2D coordinate value of the listener's position may include: detecting a skin region by using a Gaussian skin classifier; generating a binary image of the skin region detecting the edge of the skin region of the one of the images; expanding the skin binary image using a line-structuring element; detecting the skin region corresponding to the head by performing morphological image processing; and obtaining the center of the head.

The Gaussian skin classifier may be performed in relation to a region of interest (ROI) in order to efficiently use computing resources and the method of tracking the position of the head may be performed in units of frames.

The obtaining of the distance between each of the image pickup units and the listener may include: assuming that the coordinates of the 3-dimensional position of the listener are P(Xo, Yo, Zo), the focal distance of each of the image pickup units is f, and the distance between the image pickup units is d, obtaining two images of the listener using the two image pickup units from different angles of vision, respectively; obtaining the distance $(x_r - x_l)$ between the two images; and obtaining the distance (Zo) between each of the image pickup units and the listener by using the following equation:

$$Zo = fd/(x_r - x_l).$$

According to another aspect of the present invention, there is provided an apparatus for tracking a position of a head of a listener, the apparatus including: a first image pickup unit capturing a first image of the face of the listener; a second image pickup unit capturing a second image of the face of the listener from a second angle of vision different from the first; a 2-dimensional (2D) coordinate value generation unit generating a 2D coordinate value of the position by tracking a skin color of the image; and a distance calculation unit calculating a distance between the image pickup units and the listener using stereo area correlation.

The 2D coordinate value generation unit may include: a skin region detection unit detecting a skin region by using a Gaussian skin classifier; a binary image generation unit generating a binary image of the skin region by detecting the edge of the skin region of the first image; a binary image expansion unit expanding the skin binary image using a line-structuring element; a head detection unit detecting the skin region corresponding to the head by performing morphological image processing; and a head coordinate generation unit obtaining the center of the head.

The Gaussian skin classifier may be performed in relation to a region of interest (ROI) in order to efficiently use computing resources, and tracking of the position of the head for virtual stereo acoustics may be performed in units of frames.

Assuming that the coordinates of the 3-dimensional position of the listener are P(Xo, Yo, Zo), the focal distance of each of the image pickup units is f, and the distance between the image pickup units is d, the distance calculation unit may include: an image acquisition unit obtaining two images of the listener using the two image pickup units from different angles of vision, respectively; an inter-image distance obtaining unit obtaining the distance $(x_r - x_l)$ between the two images; and a listener's position calculation unit obtaining the distance (Zo) between the image pickup units and the listener by using the following equation:

$$Zo = fd/(x_r - x_l).$$

According to another aspect of the present invention, there is provided an apparatus, including: two image pickup units respectively capturing two images of a face; a 2-dimensional coordinate value generation unit generating a 2D coordinate value of a position of the face by tracking a skin color region of one of the captured images; and a distance calculation unit calculating a distance from the image pickup units to the listener using stereo area correlation of the two images.

According to another aspect of the present invention, there is provided a method, including: capturing two images of a listener's face from different perspectives via two image capturing units; determining a 2D coordinate position of the face by tracking a skin color region of one of the captured images; and calculating a distance from the image capturing units to a head of the listener via triangulation based on the two images.

According to another aspect of the present invention, there is provided a method of resetting a location of a sweet spot, including: determining a position of head of a listener by capturing two images of a listener's face from different perspectives via two image capturing units, determining a 2D coordinate position of the face by tracking a skin color region of one of the captured images, and calculating a distance from the image capturing units to a head of the listener via triangulation based on the two images; and resetting a sweet spot to coincide with the determined position.

According to still other aspects of the present invention, there are provided computer readable recording media having embodied thereon a computer program for executing the aforementioned methods.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Generally, a sweet spot of a virtual sound image system is relatively small but may be preferably broadened. However, since there is an upper limit to how far the sweet spot may be broadened, the sweet spot should be reset by tracking changes in the position of the listener. Accordingly, for such virtual stereo sound audio systems, the movement of the head of a listener is tracked.

Processes of color tracking and stereo area correlation will now be explained in the context of tracking the head of a listener.

A color tracking method employs color as a reliable characteristic for tracking the position of a moving listener. This method is based on statistical color distribution in an RGB domain. One of the properties of a listener is a skin color and this can be tracked. When color tracking is employed, tracking of a 2D position (Xo, Yo) of the listener on a single plane in a relatively complicated environment is possible. Also, color tracking uses an efficient algorithm yielding efficient calculation, which is a characteristic of an ideal algorithm.

When stereo area correlation is used to track the position of the listener, a distance (Zo) to an object in an image can be measured. Stereo area correlation requires two image pickup units. In stereo area correlation, the distance between the range of an object in the angles of vision and the listener is calculated. By using the color tracking and the stereo area correlation, the 3D position of the head of the listener can be tracked.

Figure 1:
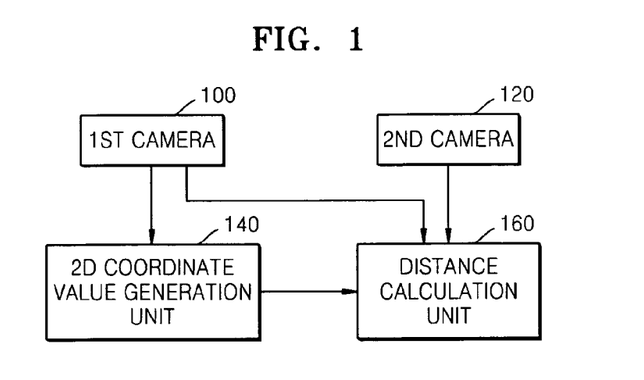
FIG. 1 is a block diagram illustrating a structure of an apparatus for tracking the position of the head of a listener for virtual stereo acoustics according to an embodiment of the present invention.

FIG. 1 is a block diagram illustrating a structure of an apparatus for tracking the position of the head of a listener for virtual stereo acoustics according to an embodiment of the present invention. The apparatus includes a first image pickup unit 100, a second image pickup unit 120, a 2D coordinate value calculation unit 140, and a distance calculation unit 160.

The first image pickup unit 100 captures an image of the face of a listener at a first angle of vision. The second image pickup unit 120 captures an image of the face of the listener at an angle of vision different from that of the first image pickup unit 100. By way of a nonlimiting example, the image pickup units may be cameras which take photographs to capture images.

The 2D coordinate value generation unit 140 generates 2D coordinate values of the position of the listener by tracking the skin color of the listener in the image captured by the first image pickup unit 100. This is color tracking. The distance calculation unit 160 calculates the distance between the image pickup units and the listener using the stereo area correlation (i.e., triangulation).

Figure 2:
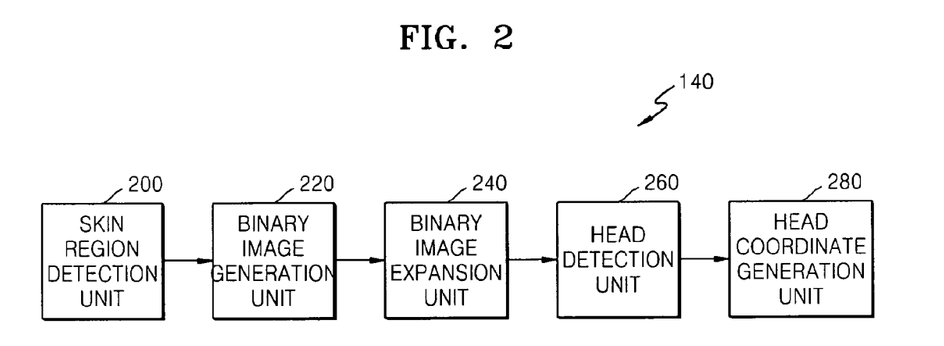
FIG. 2 is a block diagram illustrating a more detailed structure of a 2D coordinate value generation unit of FIG. 1.

FIG. 2 is a block diagram illustrating in detail the structure of the 2D coordinate value generation unit 140 of FIG. 1. The 2D coordinate value generation unit 140 includes of a skin region detection unit 200, a binary image generation unit 220, a binary image expansion unit 240, a head detection unit 260, and a head coordinate generation unit 280.

The skin region detection unit 200 detects a skin region using a Gaussian skin classifier. The Gaussian skin classifier function may be performed for a region of interest (ROI) in order to reduce the amount of computation required to achieve color tracking.

The binary region generation unit 220 generates a binary image of a skin region by detection of an edge of the skin region of the image. The binary image expansion unit 240 expands the skin binary image using a line structuring element. The head detection unit 260 detects a skin region corresponding to the head by performing morphological image processing. The head coordinate generation unit 280 obtains the center of the head. The tracking of the position of the head for virtual stereo acoustics may be performed in units of frames.

Figure 3:
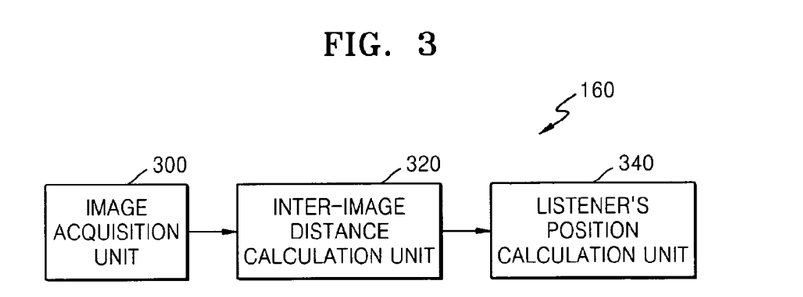
FIG. 3 is a block diagram illustrating a more detailed structure of a distance calculation unit of FIG. 1.

FIG. 3 is a block diagram illustrating in detail the structure of the distance calculation unit 160 of FIG. 1.

The distance calculation unit 160 includes an image acquisition unit 300, an inter-image distance calculation unit 320 and a listener's position calculation unit 340. The image acquisition unit 300 obtains two images of the listener using the two image pickup units at different angles of vision, respectively.

Assuming that the 3D position coordinates of the listener are P(Xo, Yo, Zo), the focal distance of each of an image pickup unit is f, and the distance between the image pickup units is d, the inter-image distance calculation unit 320 obtains the distance between two images $(x_r-x_l)$.

The listener's position calculation unit 340 obtains the distance (Zo) between the image pickup units 100 and 120 and the listener using the distance between the two image pickup units according to the following equation 8:

$$Zo=fd/(x_r-x_l) \qquad (8).$$

Figure 4:
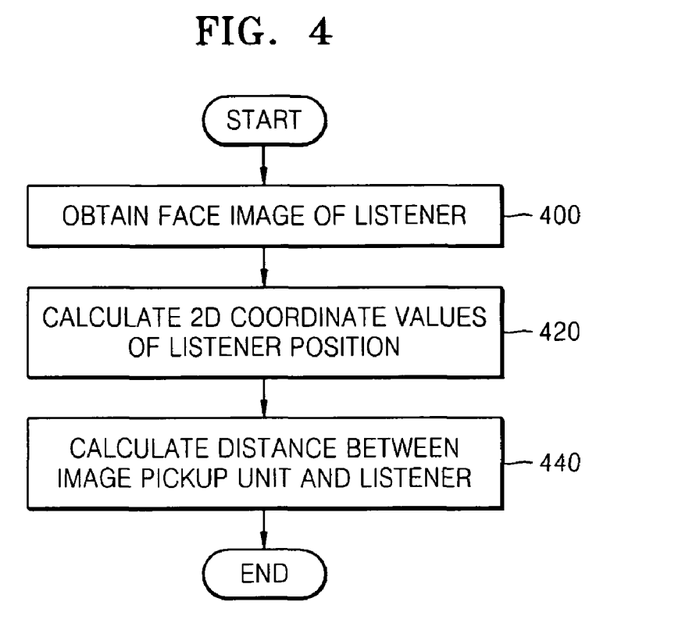
FIG. 4 is a flowchart illustrating a method of tracking the position of the head of a listener according to an embodiment of the present invention.
Figure 5:
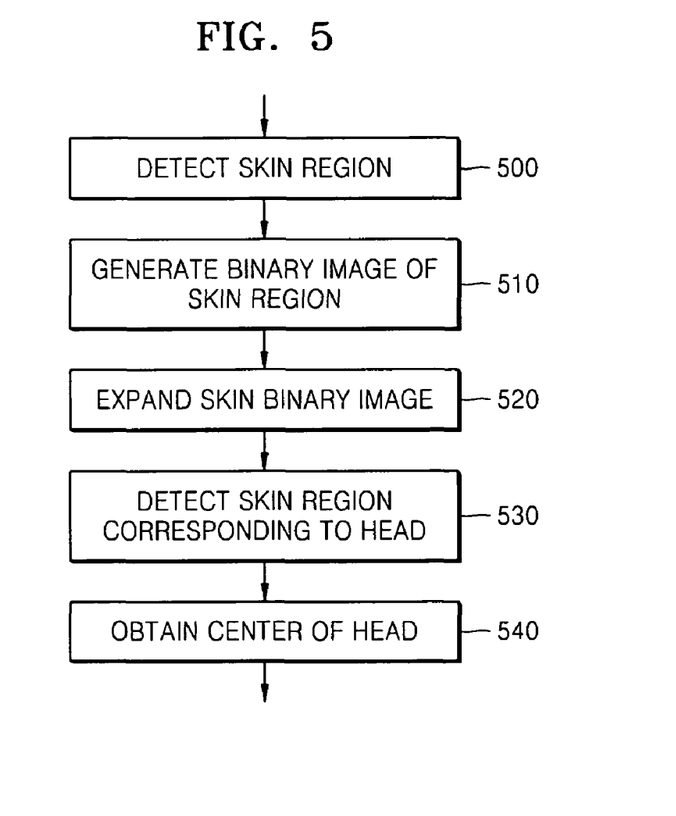
FIG. 5 is a more detailed flowchart illustrating an operation for calculating a 2D coordinate value of FIG. 4 using a color tracking method.
Figure 6:
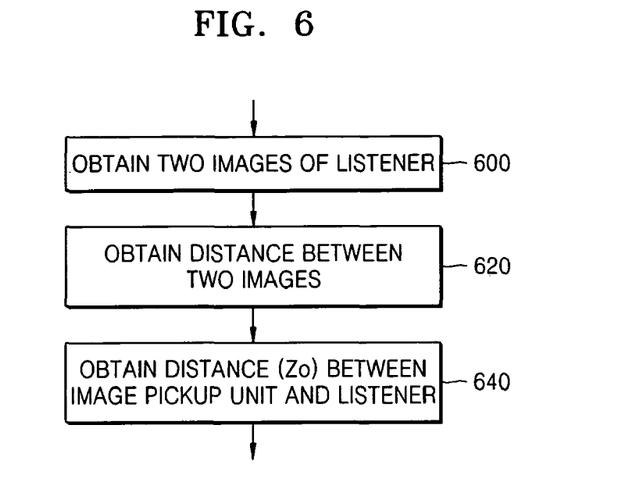
FIG. 6 is a more detailed flowchart illustrating an operation for calculating the distance between an image pickup unit and a listener of FIG. 4.

FIGS. 4 through 6 are flowcharts illustrating a method of tracking the position of the head of a listener according to an embodiment of the present invention. Operations of the method of tracking the position of the head of a listener are, for ease of explanation only, described with reference to the apparatus of FIG. 1.

Referring to FIGS. 1-6, according to the method of tracking the position of the head of a listener for virtual stereo acoustics, face images of the listener are obtained by the two image pickup units 100 and 120, in operation 400. Then, the 2D coordinate value generation unit 140 obtains the 2D coordinate value of the position of the listener by tracking the skin color of the image, in operation 420. Also, the distance calculation unit obtains the distance between each of the image pickup units and the listener using stereo area correlation (i.e., triangulation), in operation 440.

FIG. 5 is a more detailed flowchart illustrating operation 420 for calculating a 2D coordinate value. Referring to FIG. 5, the method of tracking color will now be explained in more detail.

By way of review, the utility of the color tracking method provides a distinguishable difference between the foreground and background objects in an image. Human skin is clustered in a color space of a relatively small area, and therefore a storing geometric model can be built using multivariate Gaussian classifiers. A skin color distribution can be characterized by a multivariate normal distribution in a normalized color space. This color labeling can be used in order to estimate the position of the head in an image frame and to provide a color characteristic to initialize a head position tracking system.

A face color expression in a video sequence is affected by many factors including an object relatively moving with respect to a light source, and ambient light. Also, through the human skin color is densely distributed in a relatively small space, the skin color varies with respect to persons. The skin color of a person can be used as a robust characteristic in order to track a skin color in a video sequence having predetermined ambient light. The skin color of the head of an object can be extracted by selecting a training set of skin pixels in an image. The pixel index of the training set can be used in estimating parameters of multivariate Gaussian probability distribution. The probability of the data x given the skin parameters can be expressed as the following equation 1:

$$p(x|skin) = \frac{1}{(2\pi)^{k/2}|\sum_{skin}|^{1/2}} e^{-(x-\mu)^T \Sigma_{skin}^{-1} (x-\mu)/2}. \qquad (1)$$

Here, $\Sigma$ is a 3×3 skin distribution matrix, $\mu$ is a 1×3 skin mean value, x is an N×3 matrix (entire image data), k=3 and indicates a 3-dimensional space of a color space, such as RGB or HSV.

Equation 1 is an N×1 probability value vector. Non-normalized $L_1$ can be interpreted as a condition probability density p(x|skin). The probability of the data x given the background parameters, can be expressed as the following equation 2:

$$p(x|backg) = \frac{1}{(2\pi)^{k/2}|\sum_{backg}|^{1/2}} e^{-(x-\mu)^T \Sigma_{backg}^{-1} (x-\mu)/2}. \qquad (2)$$

The final output of the method should be a normalized layer, and it can be obtained by normalizing so that the sum of values of respective layers becomes 1 as $L_1(x,y)+L_2(x,y)=1$. Here, $L_1$ is a skin layer and $L_2$ is a background layer. Thus, the following equations 2 and 3 result:

$$S=L_1+L_2 \qquad (3); \text{ and}$$

$$L_{1N}=L_1/S$$

$$L_{2N}=L_2/S \qquad (4).$$

Figure 7:
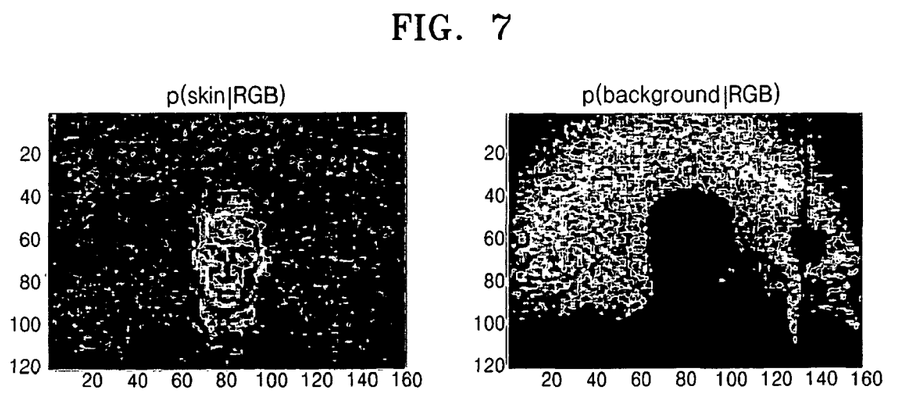
FIG. 7 illustrates a skin layer $L_{1N}$ and a background layer $L_{2N}$ obtained by using a multivariate Gaussian classifier according to an embodiment of the present invention.

Here S indicates the sum of the two layers and the sum of the normalized layers $L_{1N}$ and $L_{2N}$ respectively. The normalized layers are "posterior probabilities" of p(x|skin) and p(x|backg). That is, layer $L_{1N}$ is the probability of a skin region given in the data x, and layer $L_{2N}$ is the probability of a background in the data x. The probability of a skin region in a given image can be calculated by using equations 1 through 4 and the result is shown in FIG. 7. FIG. 7 illustrates skin layer $L_{1N}$ and background layer $L_{2N}$ obtained by using a multivariate Gaussian classifier according to an embodiment of the present invention.

Figure 8:
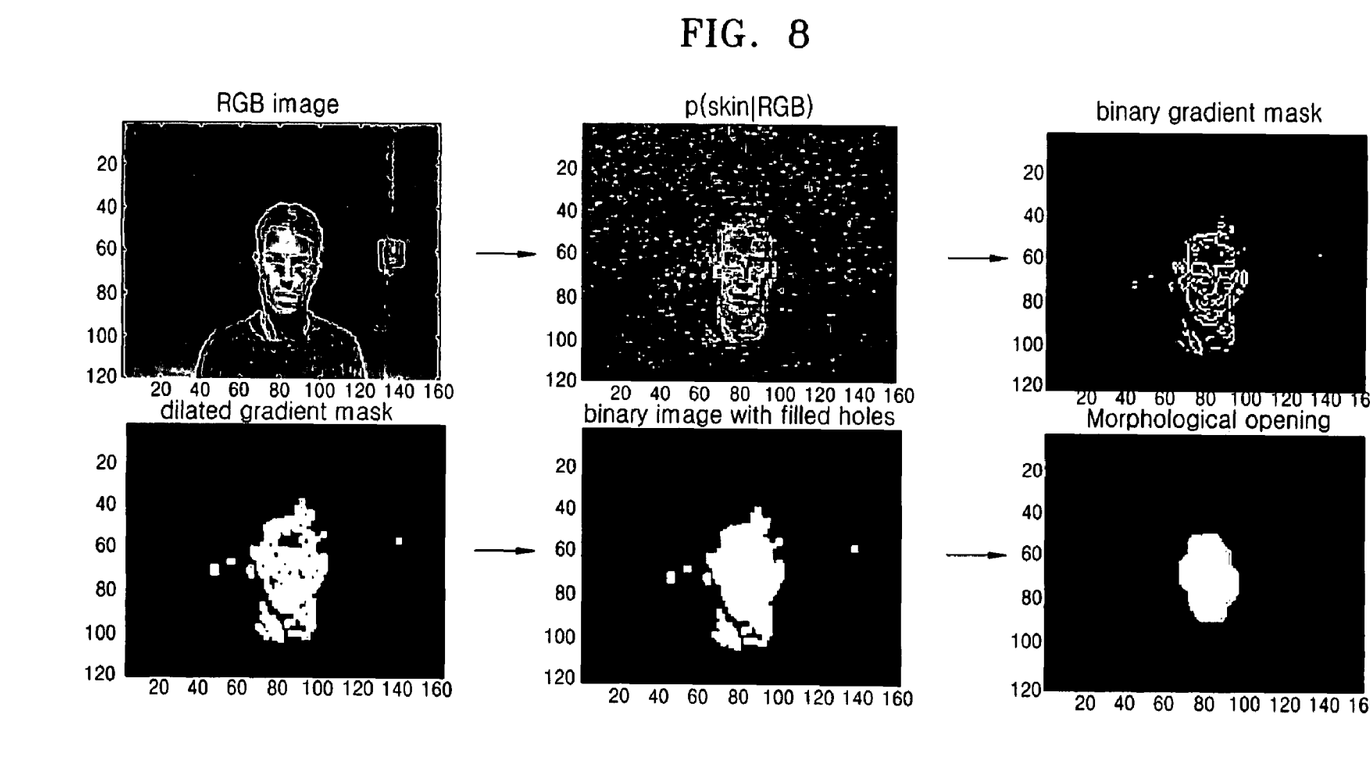
FIG. 8 illustrates segmentation of the skin layer $L_{1N}$ of FIG. 7.

FIG. 8 illustrates segmentation of skin layer $L_{1N}$ according to the present embodiment. Multivariate Gaussian color segmentation is performed for an image having a relatively complicated background.

Figure 9:
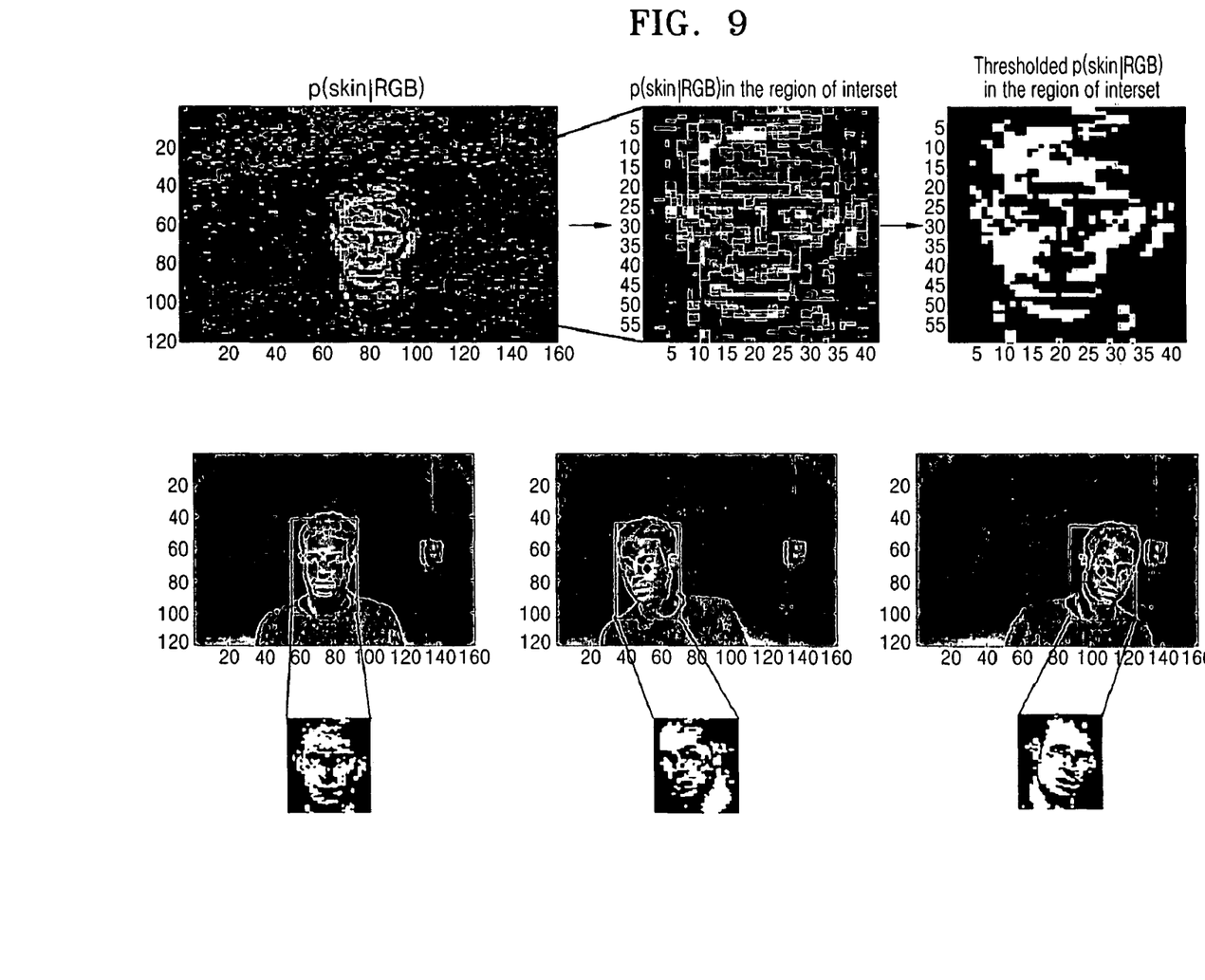
FIG. 9 illustrates application of a method of tracking the position of the head of a listener in a region of interest (ROI) according to an embodiment of the present invention.

The Gaussian skin classifier can be set so that it operates only in relation to a region of interest (ROI). The color tracking method is performed in units of frames and the center of the head is obtained by calculating a mean white pixel in the ROI. FIG. 9 illustrates application of a method of tracking the position of the head of a listener in the ROI according to an embodiment of the present invention.

The skin region detection unit 300 detects an edge using a Sobel operator in order to find an object in an image in operation 500. Then, a binary image of a skin region is generated in the binary image generation unit 220 in operation 510. Next, expansion of an image is performed with a line-structuring element through the binary image expansion unit 240, in operation 520. Then, by filling holes in the image, a solid object is generated and then, by using a morphological opening, the head detection unit 260 removes small objects while maintaining objects having big shapes and sizes in the image in operation 530. If several skin objects detected in the image exist, the size of blobs can be estimated and the biggest blob can be estimated as the head in operation 540.

The stereo area correlation will now be explained. A stereo vision method calculates distance information using triangulation.

By using two image pickup units, two images are captured from different angles of vision. Stated another way, these two image pickup units capture images of an object from different positions. These different positions result in differences between the captured images. The differences between the two images is referred to as disparity. In measuring the disparity, two images obtained by photographing an identical scene from different angles of vision are used. Estimation of relative positions of a characteristic shown in both images enables calculation of a range of the characteristic. Here, the range is the distance between the baseline of the imaging devices and the characteristic.

Figure 10:
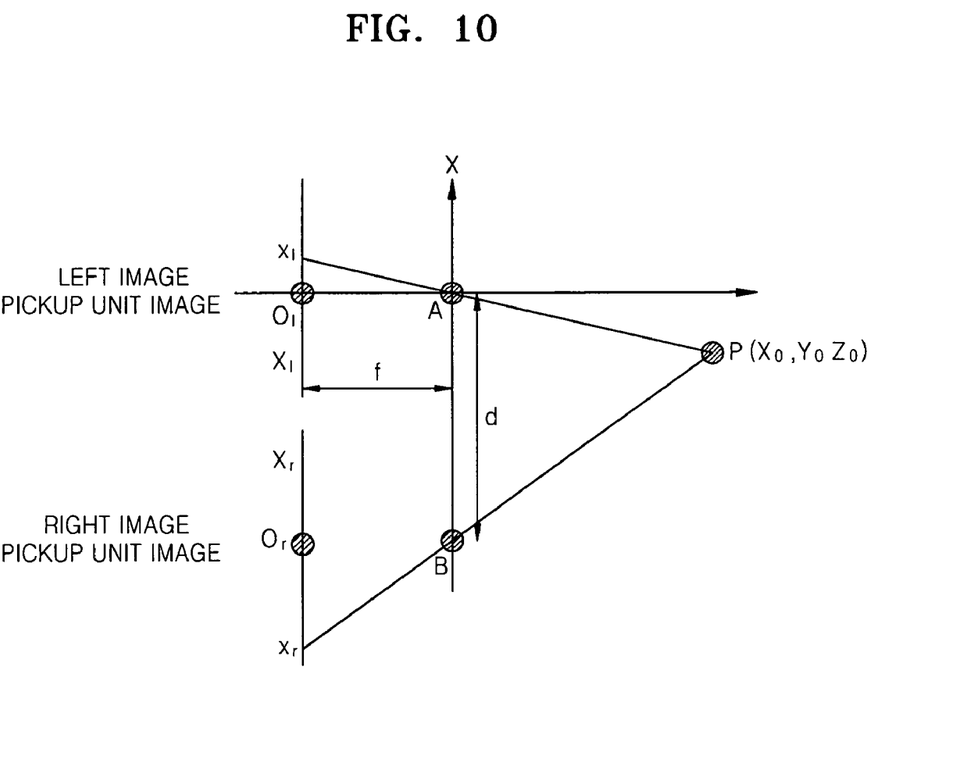
FIG. 10 illustrates a geometric structure of a stereo vision system according to an embodiment of the present invention.

FIG. 10 illustrates a geometric structure of a stereo vision system according to an embodiment of the present invention. The principle of the system is to obtain two images of an identical object from different angles of vision. Two viewpoints expressed as points A and B are the positions of the camera lenses of the two image pickup units. The distance between the two viewpoints is the distance between the two image pickup units and expressed as d. P(X, Y, Z) indicates the position of the listener in the real world having a coordinate system with its origin being O in the left image pickup unit (point A). X direction is a direction connecting the two lenses, and Y direction is on the right-hand side of an X-axis and is in parallel with an image plane. The focal distance of a lens is f. The distance between the center of an image and an object is expressed with $x_l$ and $x_r$ with respect to a local coordinate system in each image ($O_l$ or $O_r$).

Measuring of disparity will now be explained. First, two images of the listener are obtained in operation 600. Using similar triangles on an XZ plane and an XY plane shows that a line from P crosses an image plane that Z=−f, through the center of the left image pickup unit lens. Similarly, relationships in the right image pickup unit as well as the left image pickup unit are expressed as the following equations 5 and 6:

$$X_l = -Xof/Zo$$

$$Y_l = -Yof/Zo \quad (5); \text{ and}$$

$$X_r = -(Xo+d)f/Zo$$

$$Y_r = -Yof/Zo \quad (6).$$

Secondly, a 2D coordinate system in each image plane is set and rotated by 180° from the main coordinate system and is thus described by equation set 7.

$$x_l = -X_l$$

$$y_l = -Y_l$$

$$x_r = -X_r$$

$$y_r = -Y_r \quad (7).$$

Then, the distance between the two images is obtained in operation 620, and the distance (Zo) between the image pickup units and the listener is obtained in operation 640.

In relation to range Zo, the relationship can be expressed as the following equation 8:

$$Zo = fd/(x_r - x_l) \quad (8).$$

This relates to a Zo element with respect to the movement amount of pixels between two images. Zo is a function of the difference between $x_r$ and $x_l$ and since Zo should be a positive number, $x_r \geq x_l$. Finally, measuring of disparity is expressed as the following equation 9:

$$x = x_r - x_l = fd/Zo \quad (9).$$

Measuring disparity is in reverse proportion to the range of point P and is in direct proportion to focal distance f and image pickup unit distance d.

Embodiments of the present invention can be written as code/instructions/computer programs and can be implemented in general-use digital computers that execute the code/instructions/computer programs using a computer readable recording medium. Examples of the computer readable recording medium include magnetic storage media (e.g., ROM, floppy disks, hard disks, etc.), optical recording media (e.g., CD-ROMs, or DVDs), and storage media such as carrier waves (e.g., transmission through the Internet). The computer readable recording medium can also be distributed over network coupled computer systems so that the computer readable code is stored and executed in a distributed fashion.

According to the above-described embodiments, a method and apparatus for tracking the position of the head for virtual stereo acoustics, without using a magnetic, infrared, or laser method that requires much cost, a 3D position movement path of a listener can be tracked using ordinary image pickup units.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of tracking a position of a head of a listener comprising a skin region, the method comprising:
    obtaining two images using two image pickup units;
    determining the head of the listener in at least one of the two images by detecting an edge of the skin region of the head of the listener;
    tracking a skin color of one of the images, thereby obtaining a 2-dimensional (2D) coordinate value of the position, wherein a Gaussian skin classifier is applied only to a region of interest (ROI) consisting of the head of the listener substantially bound by the detected edge of the skin region of the head in order to reduce computation required to achieve color tracking; and
    obtaining a distance between the image pickup units and the listener using stereo area correlation.

2. The method of claim 1, wherein the obtaining of the 2D coordinate value of the listener's position comprises:
    generating a binary image of the skin region by detecting the edge of the skin region of the at least one of the images;
    expanding the skin binary image using a line-structuring element;
    detecting the skin region corresponding to the head by performing morphological image processing; and
    obtaining a center of the head.

3. The method of claim 2, wherein the method is performed in units of frames.

4. The method of claim 1, wherein the obtaining the distance between the image pickup units and the listener comprises:
    obtaining the two images using the two image pickup units from different angles of vision, respectively;
    obtaining a distance ($x_r - x_l$) between the two images; and
    obtaining the distance between the image pickup units and the listener using the following equation:

$$Zo = fd/(x_r - x_l), \text{ and}$$

wherein Zo is the distance and assuming that coordinates of a 3-dimensional position of the listener are P(Xo, Yo, Zo), a focal distance of each of the image pickup units is f, and a distance between the image pickup units is d.

5. An apparatus for tracking a position of a head of a listener comprising a skin region, the apparatus comprising:
    a first image pickup unit capturing a first image of the face of the listener;
    a second image pickup unit capturing a second image of the face of the listener from a second angle of vision different from the first;
    a 2-dimensional (2D) coordinate value generation unit generating a 2D coordinate value of the position by tracking a skin color of the image, wherein the 2D coordinate value generation unit comprises a skin region detection unit determining the head of the listener in at least one of the two images by detecting an edge of the skin region of the head and detecting the skin region using a Gaussian skin classifier that is applied only to a region of interest (ROI) consisting of the head of the listener substantially bound by the detected edge of the skin region of the head in order to reduce computation required to achieve color tracking; and a distance calculation unit calculating a distance between the image pickup units and the listener using stereo area correlation.

6. The apparatus of claim 5, wherein the 2D coordinate value generation unit comprises:
a binary image generation unit generating a binary image of the skin region by detecting the edge of the skin region of the first image;
a binary image expansion unit expanding the skin binary image using a line-structuring element;
a head detection unit detecting the skin region corresponding to the head by performing morphological image processing; and
a head coordinate generation unit obtaining a center of the head.

7. The apparatus of claim 6, wherein the tracking of the position of the head is performed in units of frames.

8. The apparatus of claim 5, wherein the distance calculation unit comprises:
an image acquisition unit obtaining the two images of the listener using the two image pickup units from different angles of vision, respectively;
an inter-image distance obtaining unit obtaining a distance $(x_r-x_l)$ between the two images; and
a listener's position calculation unit obtaining the distance between the image pickup units and the listener by using the following equation:

$$Zo=fd/(x_r-x_l), \text{ and}$$

wherein Zo is the distance and the coordinates of the 3-dimensional position of the listener are P(Xo, Yo, Zo), the focal distance of each of the image pickup units is f, and the distance between the image pickup units is d.

9. An apparatus, comprising:
two image pickup units respectively capturing two images, wherein a head of a listener is determined from at least one of the two images by detecting an edge of a skin region of the head;
a 2-dimensional coordinate value generation unit generating a 2D coordinate value of a position of the head by tracking a skin color region of one of the captured images, wherein a Gaussian skin classifier is applied only to a region of interest (ROI) consisting of the head of the listener substantially bound by the detected edge of the skin region of the head in order to reduce computation required to achieve color tracking;
a distance calculation unit calculating a distance from the image pickup units to the listener using stereo area correlation of the two images; and
a listener's position calculation unit setting a location of a sweet spot in a multi-channel audio signal to coincide with the 2D coordinate position of the head generated by the 2-D coordinate value generation unit.

10. A method, comprising:
capturing two images from different perspectives via two image capturing units;
determining a head of a listener in at least one of the two images by detecting an edge of a skin region of the head of the listener;
determining a 2D coordinate position of the face by tracking a skin color region of one of the captured images, wherein a Gaussian skin classifier is applied only to a region of interest (ROI) consisting of the head of the listener substantially bound by the detected edge of the skin region of the head in order to reduce computation required to achieve color tracking;
calculating a distance from the image capturing units to a head of the listener via triangulation based on the two images; and
setting a location of a sweet spot in a multi-channel audio signal to coincide with the determined 2D coordinate position of the face.

11. A method of resetting a location of a sweet spot in a multi-channel audio signal, the method comprising:
determining a position of a head of a listener by capturing two images from different perspectives via two image capturing units and by detecting an edge of a skin region of the head of the listener;
determining a 2D coordinate position of a face by tracking a skin color region of one of the captured images and calculating a distance from the image capturing units to the head of the listener via triangulation based on the two images, wherein a Gaussian skin classifier is applied only to a region of interest (ROI) consisting of the head of the listener substantially bound by the detected edge of the skin region of the head in order to reduce computation required to achieve color tracking; and
resetting the location of the sweet spot in the multi-channel audio signal to coincide with the determined position of the head of the listener.

12. A non-transitory computer readable recording medium having embodied thereon a computer program for executing the method of claim 1.

13. A non-transitory computer readable recording medium having embodied thereon a computer program for executing the method of claim 10.

14. A non-transitory computer readable recording medium having embodied thereon a computer program for executing the method of claim 11.

15. A method of resetting a location of a sweet spot in a multi-channel audio signal with respect to a location of a head of a listener, the method comprising:
tracking a head position of the listener by capturing two images from different perspectives via two image capturing units and by detecting an edge of a skin region of the head of the listener;
generating a 2D coordinate value of a position of the face by tracking a skin color region of one of the two captured images, wherein a Gaussian skin classifier is applied only to a region of interest (ROI) consisting of the head of the listener substantially bound by the detected edge of the skin region of the head in order to reduce computation required to achieve color tracking;
calculating a distance from the image pickup units to the listener using stereo area correlation of the two images; and
setting the location of the sweet spot in the multi-channel audio signal to coincide with the generated 2D coordinate position of the face.

* * * * *